H. KLEINBRAHM.
TWO CYLINDER ENGINE.
APPLICATION FILED AUG. 6, 1914.
1,143,973.
Patented June 22, 1915.
2 SHEETS—SHEET 1.
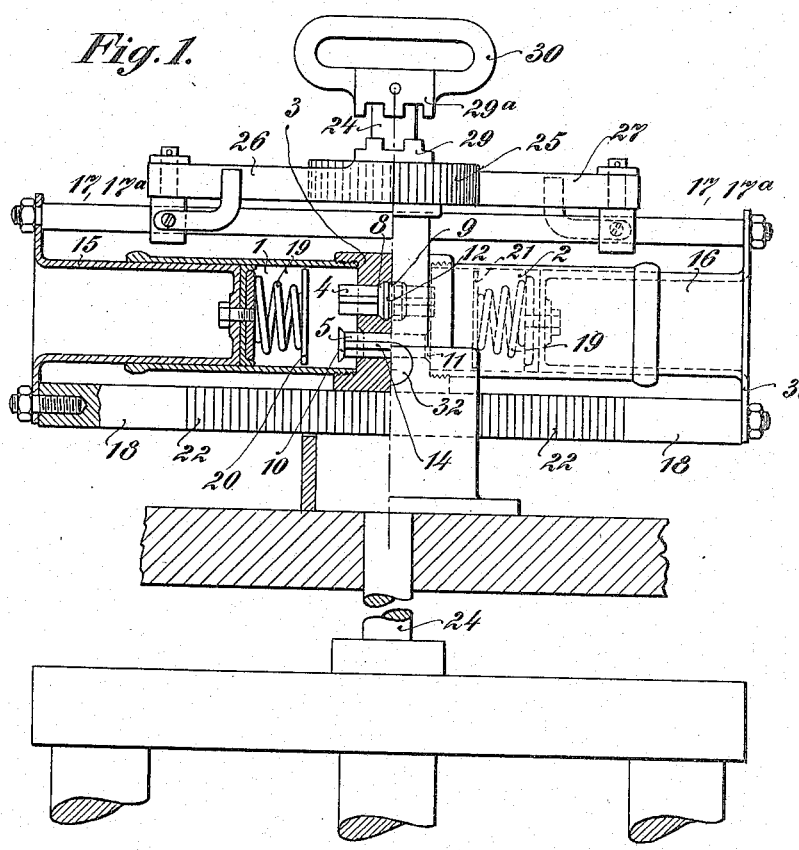
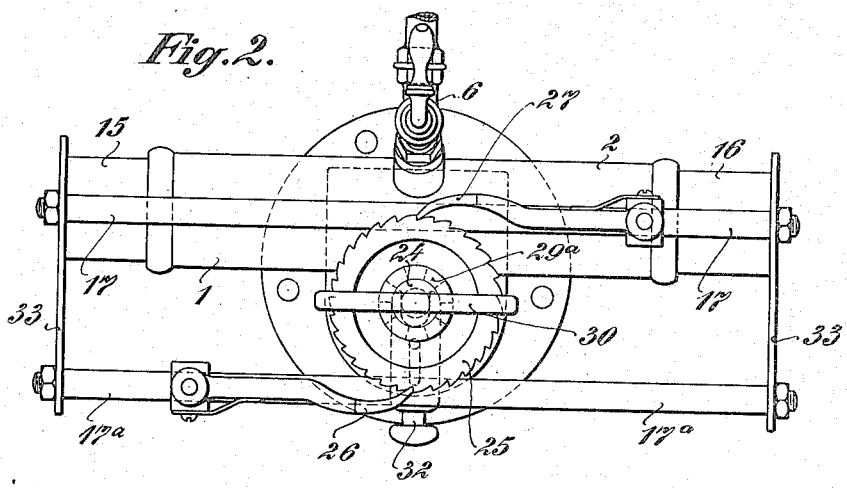

H. KLEINBRAHM.
TWO CYLINDER ENGINE.
APPLICATION FILED AUG. 6, 1914.

1,143,973.

Patented June 22, 1915.
2 SHEETS—SHEET 2.

UNITED STATES PATENT OFFICE.

HERMANN KLEINBRAHM, OF MÜLHEIM-ON-THE-RUHR, GERMANY.

TWO-CYLINDER ENGINE.

1,143,973.  Specification of Letters Patent.  Patented June 22, 1915.

Application filed August 6, 1914. Serial No. 855,390.

*To all whom it may concern:*

Be it known that I, HERMANN KLEINBRAHM, a subject of the German Emperor, residing at 12 Vereinsstrasse, Mülheim-on-the-Ruhr, Germany, manufacturer, have invented certain new and useful Improvements in Two-Cylinder Engines, of which the following is a statement.

The present invention relates to a two-cylinder engine, which may be driven by compressed air, water, steam or the like.

The design of the engine, and in particular the controlling gear is extremely simple, and the engine may be employed for either oscillating a shaft or for continuously rotating a shaft in the same direction.

Figure 3:
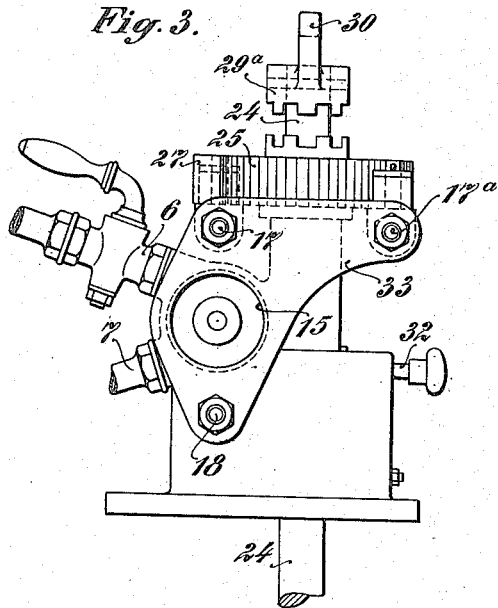
Figure 4:
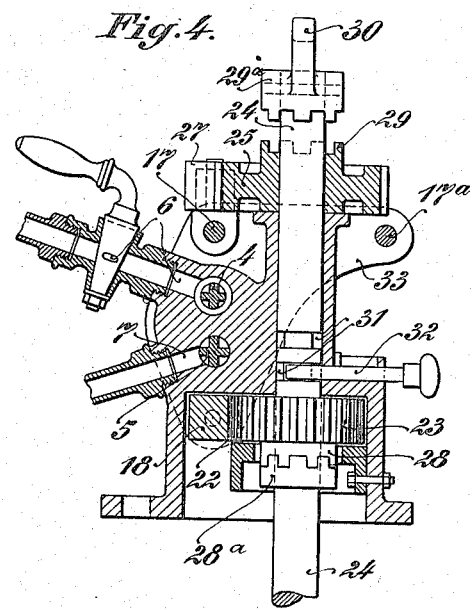
Figure 5:
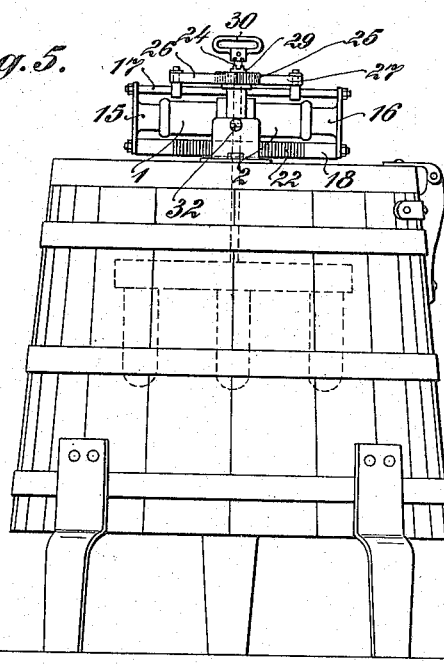

In the accompanying drawing Figure 1 shows the engine, partly in longitudinal section, partly in elevation. Fig. 2 is a top view. Fig. 3 is an end view, Fig. 4 is a cross section and Fig. 5 shows the engine fitted to a washing machine.

The two cylinders 1 and 2 of the engine are coaxially arranged behind each other and are divided from each other by a partition 3 which, if desired, may also be hollow. In this partition wall are arranged two valves 4 and 5. Of these the former communicates with the supply 6 for the pressure medium, which may be throttled or closed by means of a valve or the like, while the other valve communicates with the exhaust 7. Both valves have each two seats and the valve body 12 of the valve 4 has two jointing surfaces 8 and 9, the valve body of valve 5 two cones 10 and 11. The valve body 12 is disposed in the middle of a ribbed body, whereas the cones 10, 11 are disposed at the ends of a ribbed body 14. In the engine cylinders are fitted two suitably packed plungers 15 and 16, which are coupled with each other by means of coupling rods 17, 17ª, 18 and cross pieces 33. At their ends turned toward the partition the plungers are fitted with disks 20 and 21 respectively, which are supported by springs 19. These disks are used for controlling the valves at the two sides of the partition. When, for example, the pressure medium is acting on the plunger 16 and forces the same toward outside, the plunger 15 approaches the partition 3 and, before it has reached its terminal position, its disk 20 will push the two valve bodies 4 and 5 to the other side, so that the seat 8 of the valve 4 is opened, and the seat 9 is closed. At the same time the seat 10 of valve 5 is closed and seat 11 is opened. The consequence is that the operation of the engine is reversed, the pressure medium now entering into the cylinder 1, while the charge in the cylinder 2 escapes from the latter through the valve seat 11. When the plungers have reached the opposite position, the valve bodies are moved in the opposite sense. The coupling rod connecting the two plungers or one of these coupling rods is made in form of a rack 22 and engages a pinion 23 which is fitted to a shaft 24, for example the shaft of the agitator of a washing machine, and thereby the pinion and the shaft will be oscillated. On the shaft 24 is also fitted a toothed disk 25 and two pawls 26, 27 of opposite sense fitted to one of the coupling rods engage in this disk or ratchet wheel 25, and alternately rotate the shaft 24, to which a flywheel may be fitted, but in the same sense. Both pinion 23 and ratchet wheel 25 are fitted loose on the shaft 24, but may be independently coupled therewith by means of clutches 28 and 29 respectively, so that they cannot be operated without carrying the shaft with them, when coupled thereto. The shaft 24 is displaceably arranged, and may be raised or lowered by means of a handle 30. On this shaft are fitted the clutch members 28ª and 29ª. When, now, the shaft 24 is raised, the clutch member 28ª is engaged with the clutch teeth of the pinion 23 and the shaft 24 will be driven by the motion of said pinion. When, on the contrary, the shaft 24 is lowered, the clutch member 29ª engages in the clutch teeth of ratchet wheel 25 and the shaft 24 is revolved by the latter. The shaft is secured in its raised or lowered position respectively by means of a bolt 32 which may be engaged in grooves 31 in the shaft 24.

The hereinbefore described design of the engine has the advantage, that no stuffing boxes or similar packing means are required. This is of importance, as engines of this kind work at comparatively small pressures and therefore it is necessary, that not too much power be lost by friction.

I claim:

In an engine, the combination of two coaxially disposed cylinders, with a dividing partition, plungers engaging the cylinders, means for coupling the plungers, two double valves in the partition, one of said valves communicating with a pressure medium supply and the other valve communicating with an exhaust, elastic means on the plungers for controlling the valves, a rack and pawls operatively connected to the plungers, a shaft, a pinion loosely mounted on the shaft and adapted to be engaged by the rack, a ratchet wheel likewise loosely mounted on the shaft and adapted to be engaged by the pawls, means for coupling the pinion to the shaft, and means for coupling the ratchet wheel to the shaft.

In testimony whereof I have hereunto set my hand in the presence of two witnesses.

HERMANN KLEINBRAHM. [L. S.]

Witnesses:
 HELEN NUFER,
 ALBERT NUFER.

Copies of this patent may be obtained for five cents each, by addressing the "Commissioner of Patents, Washington, D. C."